US009807794B2

United States Patent
Asterjadhi et al.

(10) Patent No.: US 9,807,794 B2
(45) Date of Patent: Oct. 31, 2017

(54) SYSTEMS, METHODS AND DEVICES FOR DYNAMICALLY SETTING RESPONSE INDICATION DEFERRAL IN WIRELESS NETWORKS

(71) Applicant: QUALCOMM Incorporated, San Diego, CA (US)

(72) Inventors: Alfred Asterjadhi, San Diego, CA (US); Maarten Menzo Wentink, Naarden (NL)

(73) Assignee: QUALCOMM, Incorporated, San Diego, CA (US)

( * ) Notice: Subject to any disclaimer, the term of this patent is extended or adjusted under 35 U.S.C. 154(b) by 285 days.

(21) Appl. No.: 14/520,214

(22) Filed: Oct. 21, 2014

(65) Prior Publication Data

US 2015/0110093 A1    Apr. 23, 2015

Related U.S. Application Data

(60) Provisional application No. 61/902,114, filed on Nov. 8, 2013, provisional application No. 61/894,820, filed on Oct. 23, 2013.

(51) Int. Cl.
*H04W 74/00* (2009.01)
*H04W 74/08* (2009.01)

(52) U.S. Cl.
CPC ......... *H04W 74/008* (2013.01); *H04W 74/08* (2013.01)

(58) Field of Classification Search
CPC .............................. H04W 74/00; H04L 69/32
See application file for complete search history.

(56) References Cited

U.S. PATENT DOCUMENTS

| 2003/0012166 | A1 | 1/2003 | Benveniste | |
|---|---|---|---|---|
| 2003/0091066 | A1 | 5/2003 | Choi et al. | |
| 2010/0165907 | A1 | 7/2010 | Chu et al. | |
| 2012/0113903 | A1* | 5/2012 | Kneckt | H04W 74/04 370/329 |

(Continued)

OTHER PUBLICATIONS

Lv et al, IEEE802.11-13/0517r0: "Combining Process in Virtual CS Mechanism for 802.11ah." All Pages. May 2013. https://mentor.ieee.org/802.11/dcn/13/11-13-0517-00-00ah-combining-process-in-virtual-cs-for-11ah.pptx.*

(Continued)

*Primary Examiner* — Xavier Szewai Wong
(74) *Attorney, Agent, or Firm* — Knobbe, Martens, Olson & Bear LLP (57) ABSTRACT

Methods and apparatuses for wireless communication are provided. A method for wireless communication comprises receiving a first physical layer protocol data unit. The method further comprises receiving a second PPDU. The method further comprises updating a value of a response indication deferral counter to a value indicated by the second PPDU when the second PPDU is associated with a same basic service set as the first PPDU. The method further comprises updating the response indication deferral counter to the value indicated by the second PPDU when the second PPDU is associated with a different basic service set than the first PPDU and the indicated value is not less than a current value of the response indication deferral counter. The current value of the response indication deferral corresponds to a value of the response indication deferral counter when the end of the second PPDU is received.

30 Claims, 4 Drawing Sheets

(56) References Cited

U.S. PATENT DOCUMENTS

| | | | |
|---|---|---|---|
| 2012/0195302 A1* | 8/2012 | Park | H04B 7/0452 370/338 |
| 2014/0092746 A1* | 4/2014 | Kwon | H04W 28/12 370/236 |
| 2014/0092860 A1* | 4/2014 | Kneckt | H04W 72/1205 370/329 |
| 2016/0242210 A1* | 8/2016 | Seok | H04W 74/0808 |

OTHER PUBLICATIONS

International Search Report and Written Opinion—PCT/US2014/061798—ISA/EPO—dated Feb. 12, 2015.

\* cited by examiner

SYSTEMS, METHODS AND DEVICES FOR DYNAMICALLY SETTING RESPONSE INDICATION DEFERRAL IN WIRELESS NETWORKS

CLAIM OF PRIORITY UNDER 35 U.S.C. §119

This Application claims priority to: 1) Provisional Application No. 61/894,820 entitled "SYSTEMS, METHODS AND DEVICES FOR DYNAMICALLY SETTING RESPONSE INDICATION DEFERRAL IN WIRELESS NETWORKS" filed Oct. 23, 2013, and 2) Provisional Application No. 61/902,114 entitled "SYSTEMS, METHODS AND DEVICES FOR DYNAMICALLY SETTING RESPONSE INDICATION DEFERRAL IN WIRELESS NETWORKS" filed Nov. 8, 2013. The disclosure of each is hereby expressly incorporated in its entirety by reference herein.

BACKGROUND

Field

The present application relates generally to wireless communications, and more specifically to systems, methods, and devices that dynamically set a response indication deferral in wireless networks.

Background

Wireless Stations may transmit and receive utilizing different channel bandwidths each having different quality of service (QoS) requirements in terms of delay, throughput and channel utilization fairness between contending wireless devices. In order to avoid data transmission collisions within a particular wireless local access network (WLAN), wireless stations may employ the use of a response deferral indication (RID) counter, which instructs each of the wireless stations not to transmit any data while their associated RID counters have non-zero values. However, conventional protocols related to long response wireless communication frames always instruct wireless stations to set their RID counters to a predetermined, static value. Such predetermined static values may be relatively long as compared to transmit opportunity (TXOP) limit durations defined for the wireless devices in the same associated basic service set (BSS). This may result in excessive response deferral times for the wireless stations associated with the BSS that reduce the throughput efficiency of the WLAN.

SUMMARY

One aspect of the disclosure provides a method for wireless communication. The method comprises receiving a first physical layer protocol data unit (PPDU). The method comprises receiving a second PPDU. The method comprises updating a value of a response indication deferral counter to a value indicated by the second PPDU when the second PPDU is associated with a same basic service set as the first PPDU.

Another aspect discloses is an apparatus for wireless communication. The apparatus comprises a receiver configured to receive a first PPDU and receive a second PPDU. The apparatus comprises a processor configured to update a response indication deferral counter to a value indicated by the second PPDU when the second PPDU is associated with a same basic service set as the first PPDU.

Another aspect discloses a non-transitory, computer-readable medium comprising code that, when executed, causes a processor to perform a method of wireless communication. The method comprises receiving a first physical layer protocol data unit (PPDU). The method comprises receiving a second PPDU. The method comprises updating a value of a response indication deferral counter to a value indicated by the second PPDU when the second PPDU is associated with a same basic service set as the first PPDU.

Another aspect discloses an apparatus for wireless communication. The apparatus comprises means for receiving a first PPDU. The apparatus comprises means for receiving a second PPDU. The apparatus comprises means for updating a response indication deferral counter to a value indicated by the second PPDU when the second PPDU is associated with a same basic service set as the first PPDU.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11 ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range (e.g., about one kilometer or longer).

In some implementations, a WLAN includes various devices which are the components that access the wireless network. For example, there may be two types of devices: access points ("APs") and clients (also referred to as wireless stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11 ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

Figure 1:
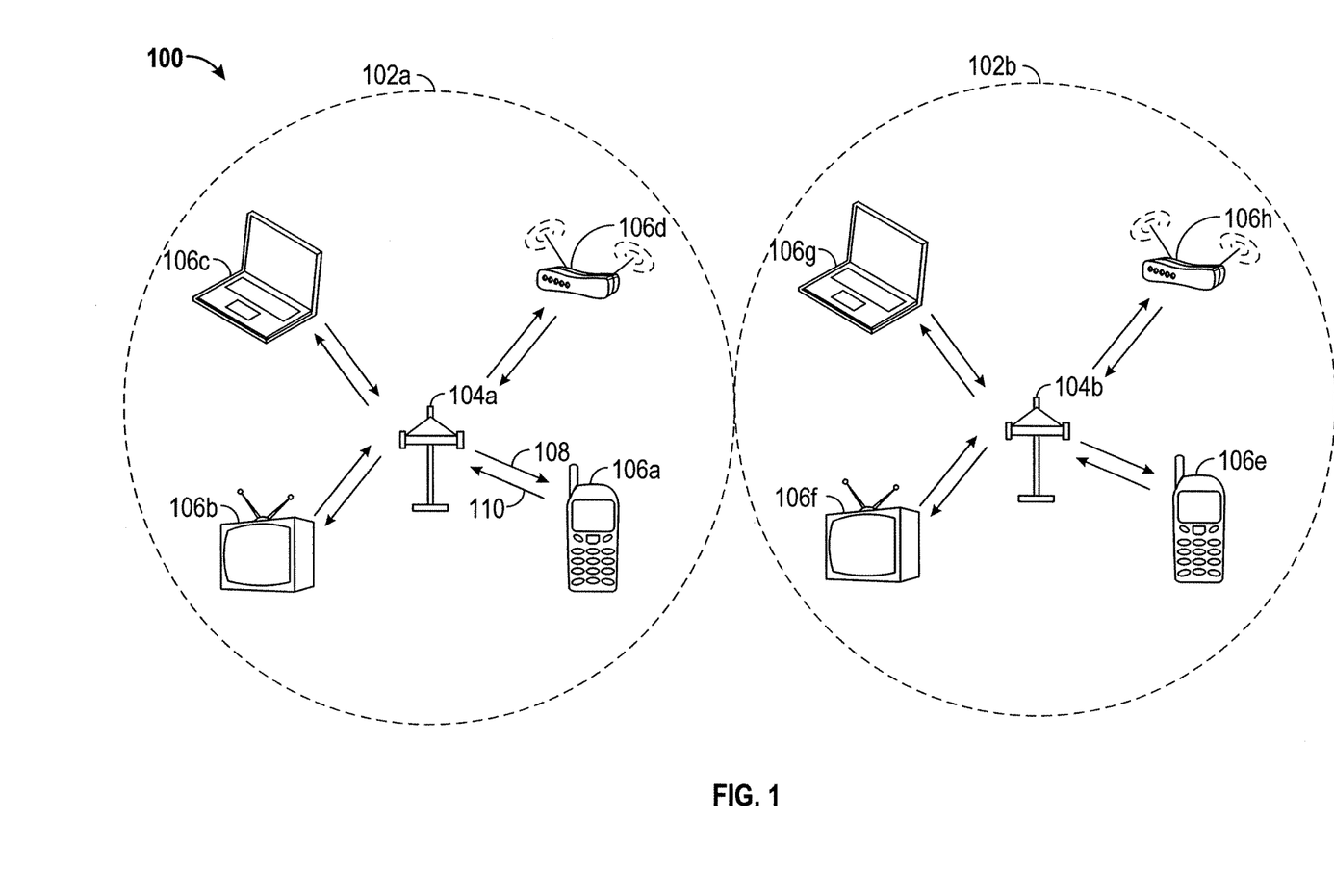
FIG. 1 illustrates an example of a wireless communication system in which aspects of the present disclosure may be employed.

FIG. 1 illustrates an example of a wireless communication system 100 in which aspects of the present disclosure may be employed. The wireless communication system 100 may operate pursuant to a wireless standard (e.g., the 802.11ah standard). The wireless communication system 100 may include an AP 104a, which communicates with STAs 106a, 106b, 106c, and 106d (collectively the STAs 106a-106d). The wireless communication system 100 may further include an AP 104b, which communicates with STAs 106e, 106f, 106g, and 106h (collectively the STAs 106e-106h).

A communication link that facilitates transmission from the AP 104a, for example, to one or more of the STAs 106a-106d may be referred to as a downlink (DL) 108, and a communication link that facilitates transmission from one or more of the STAs 106a-106d, for example, to the AP 104a may be referred to as an uplink (UL) 110. Alternatively, the downlink 108 may be referred to as a forward link or a forward channel, and the uplink 110 may be referred to as a reverse link or a reverse channel. The same terminology may refer to transmissions between the AP 104b and one or more of the STAs 106e-106h.

Each of the APs 104a and 104b may act as a base station and provide wireless communication coverage in a basic service area (BSA) 102a and 102b, respectively. In one implementation, the AP 104a along with the STAs 106a-106d associated with the AP 104a and that use the AP 104a may be referred to as a basic service set (BSS). Likewise, with respect to the BSS of the AP 104a, the AP 104b along with the STAs 106e-106h associated with the AP 104b and that use the AP 104b for communication may be referred to as an overlapping basic service set (OBSS) or a different BSS. Although communication arrows are not shown between any of the AP 104a or the STAs 106a-106d and any of the AP 104b or the STAs 106e-106h, signals transmitted from one or more of the AP 104b or the STAs 106e-106h may be unintentionally or undesirably detected or received by one or more of the STAs 106a-106d, for example.

Figure 2:
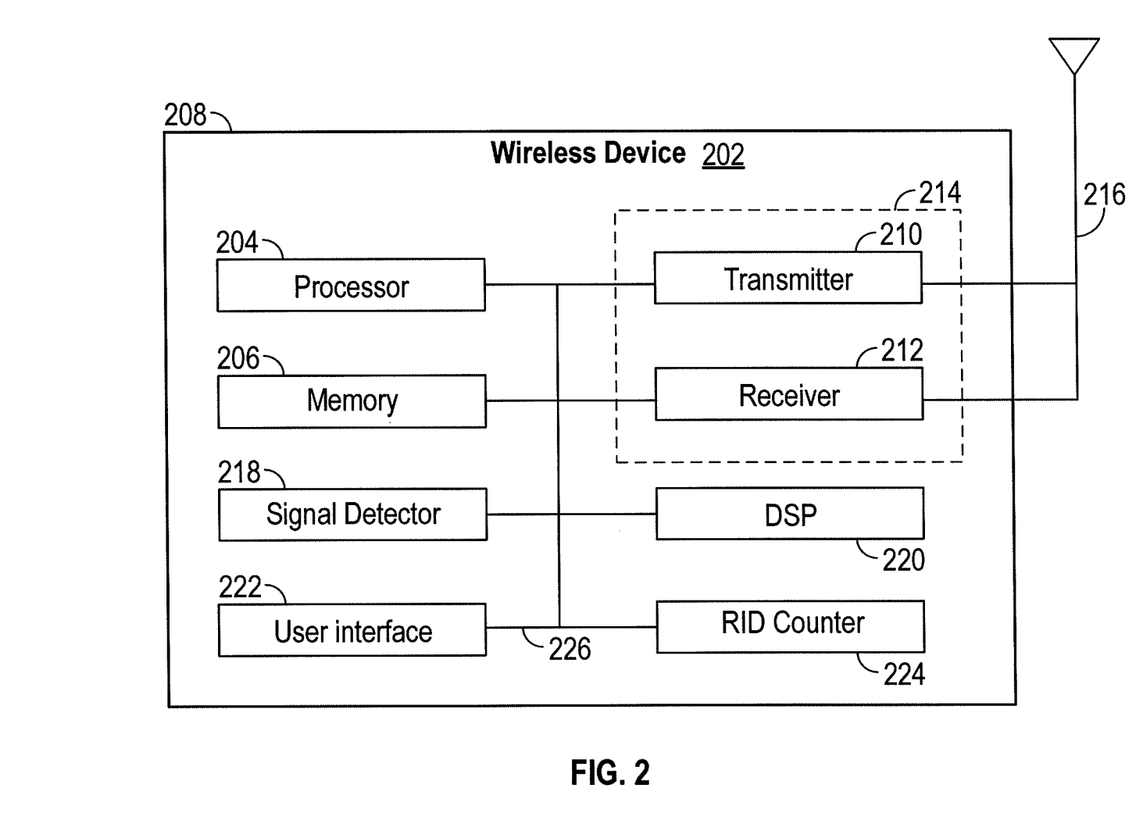
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104a, the AP 104b, or one of the STAs 106a-106h as shown in FIG. 1.

The wireless device 202 may include a processor 204 which controls operation of the wireless device 202. The processor 204 may also be referred to as a central processing unit (CPU), or hardware processor. Memory 206, which may include one or more of read-only memory (ROM), random access memory (RAM), and non-volatile random access memory (NVRAM), may provide instructions and data to the processor 204. The processor 204 typically performs logical and arithmetic operations based on program instructions stored within the memory 206. The instructions in the memory 206 may be executable to implement one or more of the methods described herein.

When the wireless device 202 is implemented or used as a transmitting node, the processor 204 may be configured to select one of a plurality of Physical Layer Convergence Procedure (PLCP), i.e., PHY header types, and to generate a packet having that PHY header type.

When the wireless device 202 is implemented or used as a receiving node, the processor 204 may be configured to process packets of a plurality of different PHY header types. For example, the processor 204 may be configured to determine the type of PHY header used in a packet and process the packet and/or fields of the PHY header accordingly.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include non-transitory computer-readable media for storing software and/or comprising code. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different PHY header types. For example, the transmitter 210 may be configured to transmit packets with different types of headers generated by the processor 204, discussed above.

The receiver 212 may be configured to wirelessly receive packets having different PHY header types. In some aspects, the receiver 212 is configured to detect a type of a PHY header used and process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222, in some aspects. The user interface 222 may comprise a keypad, a microphone, a speaker, and/or a display. The user interface 222 may include any element or component that conveys information to a user of the wireless device 202 and/or receives input from the user.

The wireless device 202 may further comprise a response indication deferral (RID) counter 224, in some aspects. The RID counter 224 may track a response indication deferral time during which the wireless device 202 may not transmit packets of data in order to avoid data collisions with one or more other wireless devices associated within its BSS or associated with an AP of an OBSS.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218, the DSP 220, and/or the RID counter 224 (in conjunction with the memory 206, for example). Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

Certain implementations described herein may be directed to wireless communication systems that may be used for smart metering or be used in a smart grid network. These wireless communication systems may be used to provide sensor applications or be used in home automation. Wireless devices used in such systems may instead or in addition be used in a healthcare context, for example, for personal healthcare. They may also be used for surveillance, to enable extended-range Internet connectivity (e.g., for use with hotspots), or to implement machine-to-machine communications. Accordingly, some implementations may use low data rates such as approximately 150 Kbps. Implementations may further have increased link budget gains (e.g., around 20 dB) over other wireless communications such as 802.11b. In accordance with low data rates, if wireless nodes are configured for use in a home environment, certain aspects may be directed to implementations with good in-home coverage without power amplification. Furthermore, certain aspects may be directed to single-hop networking without using a MESH protocol. In addition, certain implementations may result in significant outdoor coverage improvement with power amplification over other wireless protocols. Furthermore, certain aspects may be directed to implementations that may accommodate large outdoor delay-spread and reduced sensitivity to Doppler. Certain implementations may achieve similar LO accuracy as traditional WiFi.

Accordingly, certain implementations are directed to sending wireless signals with low bandwidths in sub-gigahertz bands. For example, in one exemplary implementation, a symbol may be configured to be transmitted or received using a bandwidth of 1 MHz. The wireless device 202 of FIG. 2 may be configured to operate in one of several modes. In one mode, symbols such as orthogonal frequency-division multiplexing (OFDM) symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel bandwidth.

Figure 3:
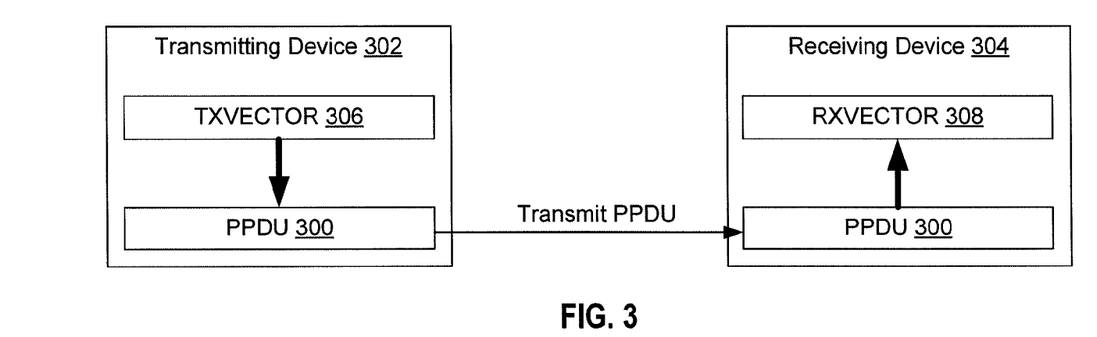
FIG. 3 is a diagram showing a transfer of information from a transmitting device's transmit vector array (TXVECTOR) to a physical layer protocol data unit (PPDU) and from the PPDU to a receiving device's receive vector array (RXVECTOR), in accordance with an exemplary implementation.

Data units exchanged by an AP and a STA, or between one STA and another STA, may include control information or data, as discussed above. Such information or data may be transferred from a transmitting device to a receiving device utilizing a TXVECTOR array of the transmitting device and an RXVECTOR array of the receiving device, wherein a PPDU carries the information between the devices. FIG. 3 is a diagram showing a transfer of information from a transmitting device's (302) TXVECTOR 306 to a PPDU 300 and from the PPDU 300 to a receiving device's (304) RXVECTOR 308, in accordance with an exemplary implementation. Before transmission of the PPDU 300, one or more subfields (see FIG. 4) of the PPDU 300 may be populated by an array of data called a transmit vector (TXVECTOR) 306 that is generated by the transmitting wireless device 302. When the PPDU 300 is subsequently received by a receiving device 304, one or more subfields of the PPDU 300, previously populated by the TXVECTOR 306 of the transmitting wireless device 302, may be utilized to populate another data array called a receive vector (RXVECTOR) 308 at the receiving device 304. The receiving device may utilize the information in the RXVECTOR 308, as populated from the one or more subfields of the received PPDU 300, to control processing of the data within the PPDU 300 and the operation of the receiving device 304.

Figure 4:
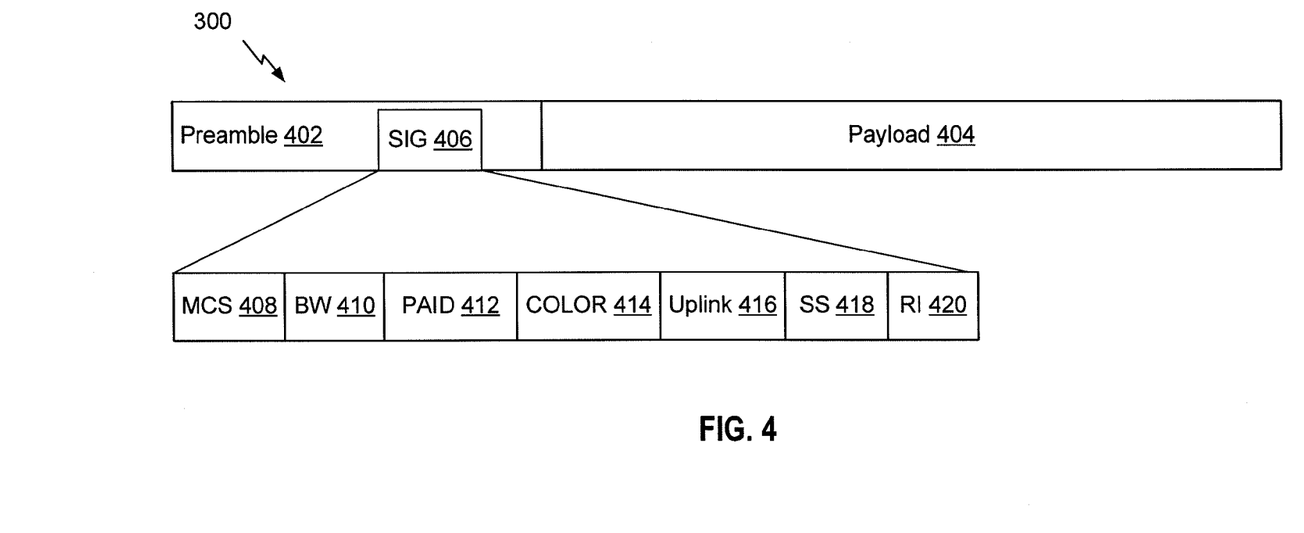
FIG. 4 is a frame diagram showing exemplary fields in one or more signal (SIG) fields of a PPDU, in accordance with an exemplary implementation.

FIG. 4 is a frame diagram showing exemplary fields in one or more signal (SIG) fields 406 of a physical layer protocol data unit (PPDU) 300, in accordance with an exemplary implementation. The PPDU 300 illustrated in FIG. 4 may show only those fields or features necessary for an understanding of the improvements thereto and so PPDU 300 may include more fields and/or subfields than those shown. The PPDU 300 may comprise a preamble 402 and a payload 404. The preamble 402 may include training fields (not shown) and one or more signal (SIG) fields 406. Before transmission of the PPDU 300, one or more subfields of the SIG field(s) 406 may be populated by the TXVECTOR as previously described in connection with FIG. 3. The subfields may include a modulation and coding scheme (MCS) field 408, a bandwidth (BW) field 410, a partial association ID (AID) field 412, a COLOR field 414, an uplink indication field 416, a spatial streams (SS) field 418, and a response indication field 420. Although the above-mentioned subfields of the SIG field 406 are shown in a particular order, the present application is not so limited, and any subset of the above-mentioned subfields and/or additional fields or subfields not mentioned here may be include in the preamble 402, SIG field 406 and/or payload 404 of PPDU 300.

The MCS field 408 may indicate a modulation and coding scheme that the PPDU 300 is to utilize. The BW field 410 may indicate a channel bandwidth with which the PPDU 300 is to be transmitted. For example, values of the BW field 410 may comprise 1 MHz, 2 MHz, 4 MHz, 8 MHz, or 16 MHz, where lower bandwidths generally provide lower transmit rates than higher bandwidths. The partial AID field 412 may include information from which the receiving device may identify the basic service set (BSS) of the STA that generated the PPDU 300. For example, the Partial AID field 412 may be set to the partial BSSID if the PPDU 300 is addressed to the AP of that BSS. The COLOR field 414 may also indicate the particular BSS with which the PPDU 300 is associated. For example, an AP transmitting a PPDU 300 will set the COLOR field 414 to a value of its choosing within the range of 0 to 7 and shall maintain that value for all transmissions in the BSS for the duration of the existence of the BSS. In one example, the COLOR field 414 may be part of the partial AID field 412 in the SIG field 406. The uplink indication field 416 may indicate whether the data to be transmitted is uplink data or downlink data. For example, a STA (e.g., the STAs 106a-106h) transmitting the PPDU 300 addressed to an associated AP may set the uplink indication field 416 to 1. Contrarily, an AP (e.g., the APs 104a and/or 104b) transmitting the PPDU 300 addressed to an associated STA, or a STA transmitting directly to another STA, may set the uplink indication field 416 to 0. It should be noted that the partial AID field 412, uplink indication field 416 and COLOR field 414 may not be present in 1 MHz PPDU frames. The response indication field 420 may identify the PPDU's expected type of response. For example, the response indication field 420 may indicate no response, a null data packet (NDP) response, a normal response (e.g., a response that is not a NDP response and that has a duration or length up to a first length), or a long response (e.g., a response that is not a NDP response and that has a duration or length than is greater than the first length). The response indication field 420 allows any wireless device receiving the PPDU 300 to determine a length of time that it should remain silent on the channel to avoid data transmission collisions with a PPDU that the transmitting device is expecting as a response from the intended receiving device. The expected response from the intended receiver, which may have different durations of response transmission time (i.e., RespTxTime), may come a short inter-frame spacing (SIFS) time after the end of the current PPDU 300. The length of time, SIFS+RespTxTime, may be referred to as a response indication deferral time.

Wireless devices (e.g., the STAs 106a-106h) may track the response indication deferral time utilizing a response indication deferral (RID) counter (e.g., the RID counter 224 shown in FIG. 2), which counts down from some initially set or reset value to 0 at a uniform rate. When a network allocation vector (NAV) and the RID counter of a particular STA are both set to 0, the virtual carrier sense indication within the particular STA may determine that the medium is idle. By contrast, when either of the NAV and RID counter is nonzero the indication is that the medium is busy. The medium is also indicated as busy when the particular STA is transmitting.

S1G STAs may be either sensors or offloading devices which operate in different bandwidths, from 1 MHz to 16 MHz as previously stated, and thus, have different quality of service (QoS) requirements. For example, offloading devices have strict QoS requirements in terms of delay, throughput and fairness. As described above, a response indication field may indicate a PPDU having no response, a null data packet response, a normal response or a long response. Conventionally, when a STA receives a PPDU having a response indication field set to long response, the STA should set its RID counter to a predetermined, static value that equals a maximum allowed PPDU transmit time (MaxPPDUTxTime), which may be equal to approximately 27 ms (e.g., 27.840 ms) in some implementations. This is, relatively speaking, a very long duration for a STA to be silent, considering that an S1G BSS may operate utilizing limited transmit opportunity (TXOP) durations on the order of several milliseconds (e.g., 4 ms) in order to satisfy delay requirements of STAs associated with the S1G BSS. Thus, for one or more of the implementations described herein, an STA (e.g., one of the STAs 106a-106h) may utilize the information in one or more of the above-described subfields of the SIG field, populated by the TXVECTOR of the transmitting wireless device, to reduce excessive response deferral times. Accordingly, the RID counter setting implementations described below should be followed by any STA, including an AP (e.g., any of the APs 104a and 104b as well as any of the STAs 106a-106h as shown in FIG. 1).

TXOP Limit Dependent RID Counter Setting

In some implementations, upon receiving a PPDU having a response indication field value equal to long response, a receiving STA may set the RID counter value to the value of the TXOP limit as advertised by the AP associated with the BSS to which the PPDU belongs. The TXOP limit may be understood as the amount of time a transmitting STA is not to exceed when communicating with another AP or STA that is associated with the same BSS. The TXOP limit values may be advertised in the enhanced distributed channel access (EDCA) Parameter Set element included in management frames (e.g., short beacons, probe responses, and EDCA parameter set action frames). For example, a STA receiving a PPDU having a response indication field value set to long response may set its RID counter to the value of the TXOP limit as advertised by the AP associated with the receiving STA if the received PPDU was generated and transmitted by a STA associated with the same BSS as the receiving STA. If the received PPDU is generated and transmitted by a STA associated with a different BSS (OBSS) than the receiving STA, the receiving STA may set its RID counter to one of two predetermined values. The first alternative is the MaxPPDUTxTime value. The second alternative is the value of the TXOP limit advertised by the AP associated with the OBSS, since the PPDU was generated and transmitted by a STA associated with the OBSS. If the second alternative is utilized, the STA may determine the OBSS TXOP limit value by reading frames transmitted by the AP of the OBSS that include the associated TXOP limit values.

Depending on the receiving STAs capability to extract additional information from the received PPDU, or other information the receiving STA has stored, the receiving STA may determine that the PPDU was generated and transmitted by a STA from the same BSS in several ways. First, either the receiver address (RA) field or the transmitter address (TA) field in the MAC header of the PPDU is the same as the address of the AP associated with the BSS. Second, for a long or short preamble PPDU transmitted utilizing a 2 MHz or greater bandwidth, the partial AID field in the SIG field is addressed to the AP of the BSS (i.e., the partial AID identifies the partial BSSID of the AP associated with the receiving STA). In this case, the uplink indication field in the SIG field having a value of 1 may provide additional verification that the PPDU is addressed to the AP associated with the BSS. Third, the COLOR field in the SIG field has the same value as the COLOR field value the receiving STA has stored from the most recently received frame from the AP associated with the BSS. In this case, the uplink indication field in the SIG field having a value of 0 may provide additional verification that the PPDU is generated by an AP or by a STA not transmitting to the AP and that the COLOR field should be taken into account to determine whether the PPDU is generated within the BSS or from another OBSS.

Likewise, the receiving STA may determine that the PPDU is generated by a STA from a different BSS (OBSS) in several ways. First, neither the RA field nor the TA field in the MAC header of the received PPDU are the same as the address of the AP associated with the BSS of the receiving STA. Second, the Partial AID field in the SIG field of the PPDU indicates that the received PPDU is not addressed to the AP of the BSS. As mentioned previously the uplink indication field may identify whether the PPDU is an uplink PPDU, which aids in the determination of whether the intended receiver is an AP. Third, the value of the COLOR field in the SIG field of the received PPDU is different from the value of the COLOR field stored by the receiving STA from the frame most recently received from the AP of the BSS. As mentioned previously, the uplink indication field may help to identify whether the PPDU is uplink, which aids the determination of whether the COLOR field should be checked. In one implementation the COLOR field may always be present in the SIG field (e.g., as a part of the partial AID field) independent of the value of the uplink indication field. In this implementation, the receiving STA compares the value of the COLOR field of the received PPDU with the stored COLOR field to determine whether the PPDU is generated within its BSS or within another OBSS. In some implementations, the receiving STA changes the stored COLOR value on a per-received packet basis and may updated the stored COLOR value only upon receiving a PPDU comprising a different COLOR value and only if the value of the response indication field in the received PPDU indicates a larger response indication value than the current RID counter value of the receiving STA. This rule may also apply in the case where the COLOR field is present in downlink frames (i.e., uplink indication field set to 0) and the partial BSSID that identifies the AP is present in uplink frames. In this implementation, the stored COLOR value may be additionally updated if the partial AID field of an uplink frame identifies a different destination AP than the AP with which the stored COLOR value is associated.

There are certain situations in which the TXOP Limit value indicated by an AP may be 0. Such a value of 0 may indicate that no STA associated with the indicating AP is allowed to set the response indication field to long response. In such a case, the receiving STA may set the RID counter value to the previously described MaxPPDUTxTime.

Bandwidth Dependent RID Counter Settings

In some other implementations, the receiving STA may base the RID counter value on the bandwidth (e.g., the value of the bandwidth field) of the received PPDU. For example, a STA receiving a PPDU having a response indication field set to long response and a bandwidth (BW) field set to CBWX (where X is the number of bandwidth MHz), may set its RID counter to a value that is a function RID_DURATION(CBWX) that depends on the bandwidth X. Thus, in one non-limiting example, CBW1 may correspond to a channel bandwidth of 1 MHz, CBW2 to 2 MHz, CBW4 to 4 MHz, CBW8 to 8 MHz, and CBW16 to 16 MHz.

The AP associated with the receiving STA may indicate the values of the function RID_DURATION(CBWX) to the receiving STA during association or via exchange of management frames. In one non-limiting example, such an indication may take the form of a table of values associated with potential bandwidth values. Alternatively, the values of the function RID_DURATION(CBWX) may be known apriori by the receiving STA. Such values may be stored in a memory of the receiving STA (e.g., the memory 206) in the form of a table, for example.

In yet another alternative, the RID counter value may be a function of MaxPPDUTxTime (e.g., RID_DURATION (MaxPPDUTxTime, CBWX), where RID_DURATION=MaxPPDUTxTime/CBWX). As one non-limiting example, the RID counter value may be approximately 27 ms/1 for 1 MHz BW, 27 ms/2 for 2 MHz, 27 ms/4 for 4 MHz, 27 ms/8 for 8 MHz, and 27 ms/16 for 16 MHz. However, such values are exemplary, not limiting and may take on any value based on a predetermined value and the channel bandwidth.

In yet another alternative, the receiving STA may calculate the RID counter value as an estimated time required to transmit a predetermined amount of payload data, (e.g., a max allowed (A-)MPDU size) using any of the information in the received PPDU (e.g., the BW field, the MCS field, the SS field, or the partial AID field).

Access Point Indicated RID Counter Settings

In yet other implementations, the AP associated with the receiving STA may indicate the RID Duration time that associated STAs use to set the RID counter when receiving a PPDU having a response indication field set to long response. The AP may indicate such RID Duration times during association or through exchange of management frames (e.g., short beacons, or action frames). Thus, a STA receiving a PPDU having a response indication field equal to long response may set its RID counter to the value of the RID Duration time advertised by the AP associated with the receiving STA if the received PPDU is generated by a STA associated with the same BSS as the receiving STA. If the received PPDU is generated by a STA associated with a different BSS (OBSS) than the receiving STA, the receiving STA may set its RID counter to a predetermined, static value (e.g., the MaxPPDUTxTime).

The above implementations are not limited to use in isolation, as the present application contemplates the use of any combination of the previously described implementations.

Figure 5:
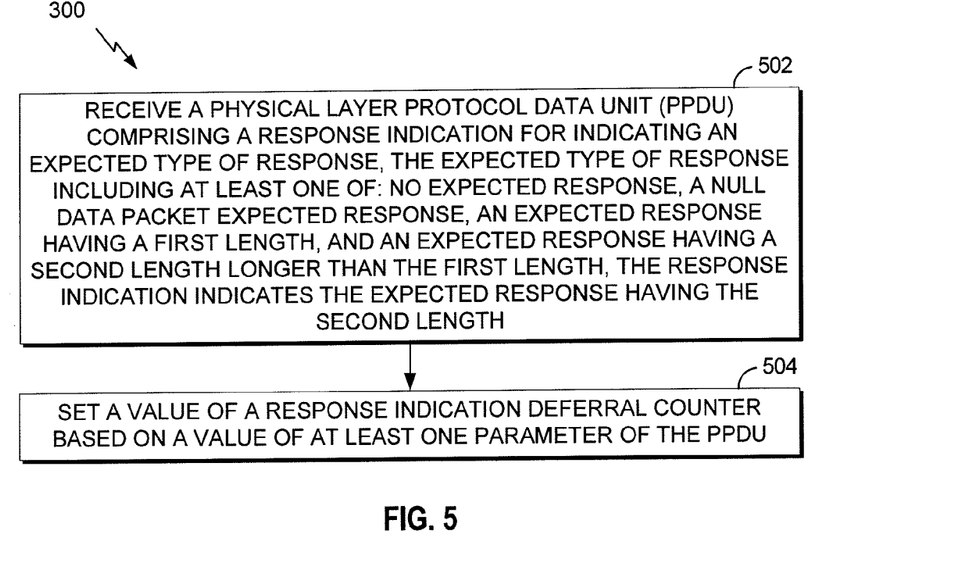
FIG. 5 is a flowchart of a method for wireless communication, in accordance with an exemplary implementation.

FIG. 5 is a flowchart 500 of a method for wireless communication, in accordance with an exemplary implementation. The method may be performed by a wireless station (e.g., the STAs 106a-106d in FIG. 1, as shown in more detail as the wireless device 202 in FIG. 2). Some implementations of the method may provide improved allocation of wireless network resources by reducing excessive deferral times of receiving wireless devices set in response to receiving a wireless data frame having a response indication field value set to long response.

The flowchart 500 may begin with block 502, which includes receiving a physical layer protocol data unit (PPDU) comprising a response indication for indicating an expected type of response, the expected type of response including at least one of: no expected response, a null data packet expected response, an expected response having a first length, and an expected response having a second length longer than the first length. The response indication indicates the expected response having the second length. Such a PPDU may be as previously described in connection with any of the TXOP Limit dependent RID counter setting, the bandwidth dependent RID counter setting, and the access point indicated RID counter setting sections above.

Block 504 includes setting a value of a response indication deferral counter based on a value of at least one parameter of the first PPDU. As described in the TXOP-limit-dependent RID counter setting section above, the value may be one of the TXOP Limit value for the BSS of the receiving STA, the TXOP Limit value for the OBSS, or a predetermined, static value (e.g., the MaxPPDUTxTime) depending on whether the PPDU was generated and transmitted by a STA in the same BSS as the receiving STA or by an STA in another BSS (OBSS). In such implementations, the at least one parameter may comprise the RA field and/or TA field in the MAC header of the PPDU, and/or the partial AID, uplink or COLOR fields within the SIG field of the preamble of the PPDU, which the STA may utilize to determine whether the PPDU was generated and transmitted by a STA in the same BSS as the receiving STA or by an STA in another BSS (OBSS).

As described in the bandwidth-dependent RID counter setting section above, the value of the response indication deferral counter may be determined as a function of the bandwidth of the received PPDU or as an estimated or calculated time required to transmit a given amount of payload data utilizing the bandwidth of the received PPDU. In such implementations, the at least one parameter may comprise one or more of the BW field, the MCS field, the SS field, or the partial AID field within the SIG field of the PPDU, as previously described. Where an AP indicates the values associated with potential bandwidths of the received PPDU, the method may further include receiving a message from an access point, the message indicating the values of the response indication deferral counter for each of a plurality of potential bandwidths of the PPDU.

As described in the Access Point indicated RID counter setting section above, the value of the response indication deferral counter may be previously indicated by the AP associated with the receiving STA during association or through exchange of management PPDUs (e.g., short beacons, or action PPDUs) if the received PPDU is generated and transmitted by a STA associated with the same BSS as the receiving STA. If the received PPDU is generated and transmitted by an STA associated with an OBSS the value of the response indication deferral counter may be a predetermined value (e.g., the MaxPPDUTxTime). In such implementations, the at least one parameter may comprise the RA field and/or the TA field in the MAC header of the PPDU, and/or the partial AID, uplink or COLOR fields within the SIG field of the preamble of the PPDU. The STA may utilize the value(s) in one or more of these fields to determine whether the PPDU was generated and transmitted by a STA in the same BSS as the receiving STA or by an STA in another BSS (OBSS), as previously described. Where an AP indicates the appropriate values for the RID counter, the method may further include a step including receiving a message indicating the value from an access point.

Each of the above implementations are not limited to use in isolation, as the present application contemplates the use of any combination of the previously described implementations.

Dynamic Updating of the RID Counter Value

Conventionally, a STA updates its RID counter value every time the STA receives a new packet. This may not be desirable if the immediately previously received frame having a response indication field set to long response was sent by an OBSS and the new received frame is sent by a STA in another BSS. For example, such a case would result in the receiving STA resetting its RID (e.g., not counting down as for a long response duration) even though a STA in the OBSS may still have an ongoing transmission that is hidden from the receiving STA. Accordingly, it may be desirable to define a mechanism by which a STA receiving a PPDU may make a dynamic determination of whether to update its RID counter value, instead of updating its RID counter automatically upon receipt of the PPDU.

Figure 6:
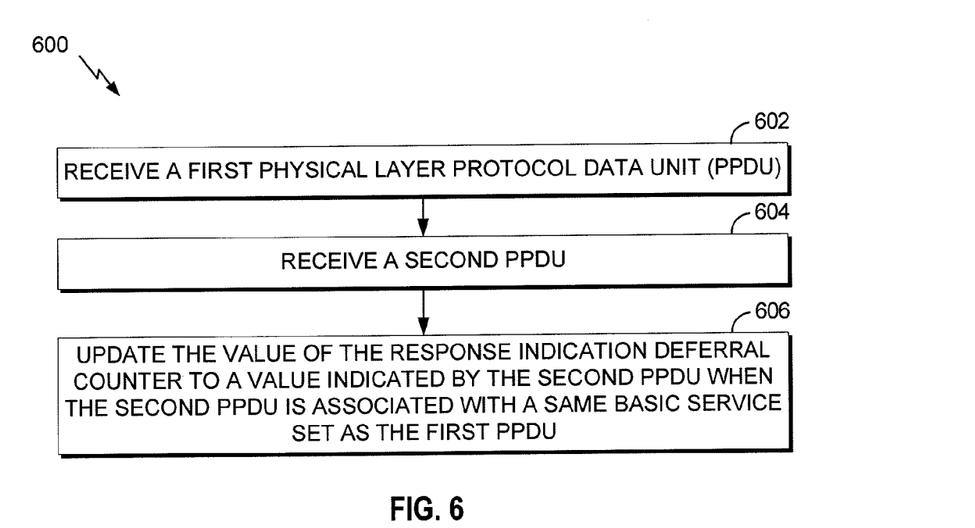
FIG. 6 is a flowchart of a method for wireless communication, in accordance with another exemplary implementation.

FIG. 6 is a flowchart 600 of a method for wireless communication, in accordance with another exemplary implementation. The method 600 may be performed by a wireless station (e.g., the STAs 106a-106h or APs 104a and 104b in FIG. 1, shown in more detail as the wireless device 202 in FIG. 2).

Block 602 includes receiving a first physical layer protocol data unit (PPDU). The first PPDU may also be the latest PPDU the receiving STA used to update its RID counter value.

In some implementations, the receiving STA may store a value of at least one parameter of the first PPDU in a memory device (e.g., the memory 206 of the wireless device 202 shown in FIG. 2). As previously described, the at least one parameter may comprise a value of the COLOR field within the SIG field of the received PPDU, which may be utilized by the receiving STA to identify the BSS with which the first received PPDU (e.g., the first PPDU) is associated. In implementations where the COLOR field is not present (e.g., where the PPDU is a 1 MHz bandwidth PPDU or where the uplink indication field of a PPDU transmitted at utilizing a bandwidth of ≥2 MHz is set to zero), the receiving STA may store a value of −1 (or any value other than 0-7). In the alternative, where the COLOR field is not present, the at least one parameter may comprise the partial AID field within the SIG field of the received PPDU, which may alternatively be utilized by the STA to identify the BSS with which the first received PPDU is associated. In another alternative, the at least one parameter may comprise the RA or TA field identifying the AP of the BSS of the MAC header to identify the BSS with which the first PPDU is associated.

Block 604 includes receiving a second PPDU. In some implementations, the second PPDU may be the PPDU previously described in connection with Block 502 of the flowchart 500 in FIG. 5. Thus, in some implementations, the flowchart 500 may be a continuation of the flowchart 600 of FIG. 6.

Block 606 includes updating a value of a response indication deferral counter to a value indicated by the second PPDU when the second PPDU is associated with a same basic service set as the first PPDU. As previously described, if a value of the COLOR field of the first PPDU is the same as the value of the COLOR field of the second PPDU, the receiving STA may determine that the first PPDU and the second PPDU were generated by a STA or AP associated with the same BSS. In such a case, the wireless communication device sending the second PPDU would be associated with the same BSS as the receiving STA and, thus, at least one of the STAs participating in the PPDU exchange would not be a hidden node. In such a case, the receiving STA may update its RID counter value based on the values of the RXVECTOR parameters, as populated from the fields within the SIG field of the second PPDU, as described above with respect to FIG. 5. The same determination and logic may apply utilizing the partial AID field rather than the COLOR field, as previously described.

Where the BSSs associated with the first and second PPDUs are not the same (e.g., different), the receiving wireless device may only update its RID counter value, as indicated by the second PPDU, if such an update would result in a larger (or in some implementations, an equal) RID counter value than the current RID counter value (e.g., the update value is not less than the current RID counter value). In some implementations, the current value of the RID counter may correspond to the value of the RID counter at a time when the end of the second PPDU is received by the receiving wireless device (e.g., when the last bit of the second communication PPDU has been received by the receiving STA). In this way, when the receiving STA receives the second PPDU associated with another BSS (OBSS), the receiving STA will not incorrectly reset its RID counter value to a lower value that would result in potential data transmission collisions if the receiving STA began to transmit prematurely.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel bandwidth" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a non-transitory computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communication by a wireless device, comprising:
   receiving a first physical layer protocol data unit (PPDU) associated with a basic service set,
   receiving a second PPDU, and
   updating a value of a response indication deferral counter to a value indicated by the second PPDU on the condition that the second PPDU is associated with the basic service set of the first PPDU, wherein the value of the response indication deferral counter indicates a deferral time during which the wireless device receiving the second PPDU does not transmit packets of data in order to avoid data collisions with one or more other wireless devices associated within the basic service set or associated with a different basic service set.

2. The method of claim 1, further comprising updating the response indication deferral counter to the value indicated by the second PPDU on the condition that the second PPDU is associated with the different basic service set and the indicated value is not less than a current value of the response indication deferral counter.

3. The method of claim 2, wherein the current value of the response indication deferral counter corresponds to a value of the response indication deferral counter when the end of the second PPDU is received.

4. The method of claim 1, further comprising:
   receiving a partial association identification (Partial AID) field of the second PPDU; and
   determining that the second PPDU is associated with the basic service set of the first PPDU when the partial association identification (Partial AID) field of the second PPDU indicates an address of an access point associated with the basic service set of the first PPDU.

5. The method of claim 1, further comprising:
   receiving a COLOR field of the second PPDU; and
   determining that the second PPDU is associated with the basic service set of the first PPDU when the COLOR field of the second PPDU indicates that the second PPDU was generated by an access point associated with the basic service set of the first PPDU.

6. The method of claim 1, further comprising:
   determining the basic service set associated with the first PPDU based on at least one parameter of the first PPDU, and
   determining the basic service set associated with the second PPDU based on at least one parameter of the second PPDU.

7. The method of claim 1, wherein the second PPDU comprises a response indication field for indicating an expected type of response, the expected type of response including one of: no expected response, a null data packet expected response, an expected response having a first length, and an expected response having a second length longer than the first length, the method further comprising:

setting the value of the response indication deferral counter to a maximum PPDU transmit time based on an indication in the response indication field of the second PPDU.

8. The method of claim 1, wherein the second PPDU comprises a response indication field for indicating an expected type of response, the expected type of response including one of: no expected response, a null data packet expected response, an expected response having a first length, and an expected response having a second length longer than the first length, the method further comprising:
setting the value of the response indication deferral counter to a value indicated by the response indication field associated with the second PPDU.

9. An apparatus for wireless communication, the apparatus comprising:
a receiver configured to receive a first PPDU associated with a basic service set and receive a second PPDU; and
a processor configured to update a response indication deferral counter to a value indicated by the second PPDU on the condition that the second PPDU is associated with the basic service set of the first PPDU, wherein the value of the response indication deferral counter indicates a deferral time during which the apparatus does not transmit packets of data in order to avoid data collisions with one or more wireless devices associated within the basic service set or associated with a different basic service set.

10. The apparatus of claim 9, wherein the processor is further configured to update the response indication deferral counter to the value indicated by the second PPDU on the condition that the second PPDU is associated with the different basic service set and the indicated value is not less than a current value of the response indication deferral counter.

11. The apparatus of claim 10, wherein the current value of the response indication deferral counter corresponds to a value of the response indication deferral counter when the end of the second PPDU is received.

12. The apparatus of claim 9, wherein the second PPDU includes a partial association identification (Partial AID) field, and wherein the processor is further configured to determine that the second PPDU is associated with the basic service set of as the first PPDU when the Partial AID field of the second PPDU indicates an address of an access point associated with the basic service set of the first PPDU.

13. The apparatus of claim 9, wherein the second PPDU includes a COLOR field, and wherein the processor is further configured to determine that the second PPDU is associated with the basic service set of the first PPDU when the COLOR field of the second PPDU indicates that the second PPDU was generated by an access point associated with the basic service set of the first PPDU.

14. The apparatus of claim 9, wherein the processor is further configured to:
determine the basic service set associated with the first PPDU based on at least one parameter of the first PPDU, and
determine the basic service set associated with the second PPDU based on at least one parameter of the second PPDU.

15. The apparatus of claim 9, wherein the second PPDU comprises a response indication field for indicating an expected type of response, the expected type of response including one of: no expected response, a null data packet expected response, an expected response having a first length, and an expected response having a second length longer than the first length,
the processor further configured to set the value of the response indication deferral counter to a maximum PPDU transmit time based on the response indication field of the second PPDU.

16. The apparatus of claim 9, wherein the second PPDU comprises a response indication field for indicating an expected type of response, the expected type of response including one of: no expected response, a null data packet expected response, an expected response having a first length, and an expected response having a second length longer than the first length,
the processor further configured to set the value of the response indication deferral counter to a value indicated by the response indication field associated with the second PPDU.

17. A non-transitory, computer readable medium comprising code that when executed cause a processor to perform a method of wireless communication by a wireless device, the method comprising:
receiving a first PPDU associated with a basic service set,
receiving a second PPDU, and
updating a value of a response indication deferral counter to a value indicated by the second PPDU on the condition that the second PPDU is associated with the basic service set of the first PPDU, wherein the value of the response indication deferral counter indicates a deferral time during which the wireless device receiving the second PPDU does not transmit packets of data in order to avoid data collisions with one or more other wireless devices associated within the basic service set or associated with a different basic service set.

18. The medium of claim 17, wherein the code, when executed, causes the processor to perform the method further comprising updating the response indication deferral counter to the value indicated by the second PPDU on the condition that the second PPDU is associated with the different basic service set and the value indicated by the second PPDU is not less than a current value of the response indication deferral counter.

19. The medium of claim 18, wherein the current value of the response indication deferral counter corresponds to a value of the response indication deferral counter when the end of the second PPDU is received.

20. The medium of claim 17, wherein the code, when executed, causes the processor to perform the method further comprising:
receiving a partial association identification (Partial AID) field of the second PPDU; and
determining that the second PPDU is associated with the basic service set of the first PPDU when the Partial AID field of the second PPDU indicates an address of an access point associated with the basic service set of the first PPDU.

21. The medium of claim 17, wherein the code, when executed, causes the processor to perform the method further comprising:
receiving a COLOR field of the second PPDU; and
determining that the second PPDU is associated with the basic service set of as the first PPDU when the COLOR field of the second PPDU indicates that the second PPDU was generated by an access point associated with the basic service set of the first PPDU.

22. The medium of claim 17, wherein the code, when executed, causes the processor to perform the method further comprising:
  determining the basic service set associated with the first PPDU based on at least one parameter of the first PPDU, and
  determining the basic service set associated with the second PPDU based on at least one parameter of the second PPDU.

23. The medium of claim 17, wherein the second PPDU comprises a response indication field for indicating an expected type of response, the expected type of response including one of: no expected response, a null data packet expected response, an expected response having a first length, and an expected response having a second length longer than the first length, the method further comprising:
  setting the value of the response indication deferral counter to a maximum PPDU transmit time based on an indication in the response indication field of the second PPDU.

24. The medium of claim 17, wherein the second PPDU comprises a response indication field for indicating an expected type of response, the expected type of response including one of: no expected response, a null data packet expected response, an expected response having a first length, and an expected response having a second length longer than the first length, the method further comprising:
  setting the value of the response indication deferral counter to a value indicated by the response indication field associated with the second PPDU.

25. An apparatus for wireless communication, the apparatus comprising:
  means for receiving a first PPDU associated with a basic service set;
  means for receiving a second PPDU; and
  means for updating a response indication deferral counter to a value indicated by the second PPDU on the condition that the second PPDU is associated with the basic service set of the first PPDU, wherein the value of the response indication deferral counter indicates a deferral time during which the apparatus does not transmit packets of data in order to avoid data collisions with one or more wireless devices associated within the basic service set or associated with a different basic service set.

26. The apparatus of claim 25, further comprising means for updating the response indication deferral counter to the value indicated by the second PPDU on the condition that the second PPDU is associated with the different basic service set and the indicated value is not less than a current value of the response indication deferral counter.

27. The apparatus of claim 25, further comprising:
  means for receiving a partial association identification (Partial AID) field; and
  means for determining that the second PPDU is associated with the basic service set of the first PPDU when the Partial AID field of the second PPDU indicates an address of an access point of the basic service set of the first PPDU.

28. The apparatus of claim 25, further comprising:
  means for receiving a COLOR field; and
  means for determining that the second PPDU is associated with the basic service set of the first PPDU when the COLOR field of the second PPDU indicates that the second PPDU was generated by an access point associated with the basic service set of the first PPDU.

29. The apparatus of claim 25, wherein the second PPDU comprises a response indication field for indicating an expected type of response, the expected type of response including one of: no expected response, a null data packet expected response, an expected response having a first length, and an expected response having a second length longer than the first length, the apparatus further comprising:
  means for setting the value of the response indication deferral counter to a maximum PPDU transmit time based on the response indication field of the second PPDU.

30. The apparatus of claim 25, wherein the second PPDU comprises a response indication field for indicating an expected type of response, the expected type of response including one of: no expected response, a null data packet expected response, an expected response having a first length, and an expected response having a second length longer than the first length, the apparatus further comprising:
  means for setting the value of the response indication deferral counter to a value indicated by the response indication field associated with the second PPDU.

* * * * *